Oct. 13, 1931.  C. C. HANSEN  1,827,195
CLAMP
Filed Jan. 14, 1930

INVENTOR.
Charles C Hansen
BY Chester A. Adee
HIS ATTORNEY.

Patented Oct. 13, 1931

1,827,195

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

CLAMP

Application filed January 14, 1930. Serial No. 420,692.

This invention relates to clamps, but more particularly to a clamp adapted for securing a flexible conduit to a nozzle or pipe connection.

One object of the invention is to enable the clamp to be used in connection with conduits of different diameters, and another object is to provide a clamp having integral means against which the clamping force may be applied for tightening the clamp on a conduit.

Other objects will be in part obvious and in part pointed out hereinafter.

Figure 1:
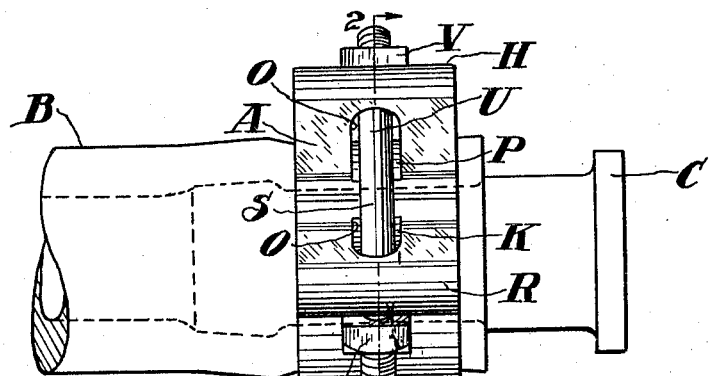
Figure 2:
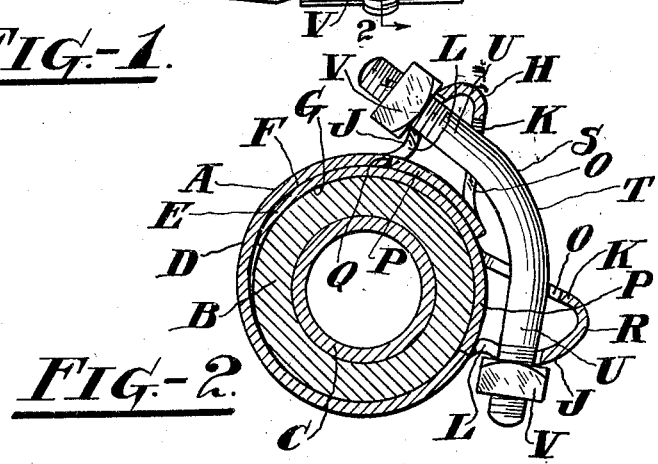
Figure 3:
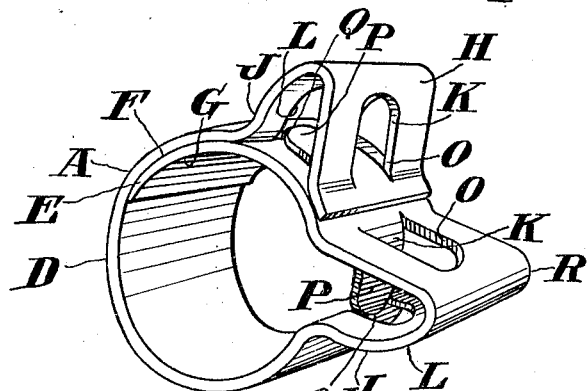

In the accompanying drawings illustrating the invention and in which similar reference characters refer to similar parts, Figure 1 is a side elevation of the clamp showing it applied to a conduit, Figure 2 is a transverse view taken through Figure 1 on the line 2—2 looking in the direction indicated by the arrows, and Figure 3 is a perspective view of the clamp.

Referring more particularly to the drawings, the clamp which is designated by A is shown applied to a flexible conduit B for clamping the conduit to a metallic coupling C.

The clamp comprises a single band D which may be suitably curved to conform substantially to the contour of the conduit B.

The band D is of such length that the ends thereof overlap, in other words, a tongue E which forms one end of the band is adapted to be folded beneath the opposite end of the band D. Preferably, the tongue E is suitably tapered so that its top and bottom surfaces F and G respectively converge at the free end of the tongue. In this way there will be avoided the existence of a space between any portion of the band and the conduit B when the band is securely clamped to the conduit.

On one end of the band D is a U-shaped ear or fold H which is an integral portion of the band D. Within the legs J and K of the fold H are apertures L and O respectively which are formed by punching or similar operation.

The metal displaced in the leg K to form the aperture O remains attached at one end to the said leg K to form a clip P which is suitably curved to conform to the general curvature of the band D, and the free end Q of the clip P is seated against the main body of the band D and in the bottom of the aperture L in the leg J.

Intermediate the ends of the band D is a second fold R which is similar in all essential respects to the fold H. The fold R accordingly has legs J and K which are also provided with perforations L and O respectively. These perforations, like those in the loop H, are formed by punching portions of metal therefrom. The metal displaced from the leg K in the fold R also forms a clip P which is adapted to seat against the bottom of the aperture L in the leg J.

By permitting the clips P to extend across the gaps between the extremities of the legs J and K of the folds and by seating said clips against the main body portion of the band D the legs of the folds will at all times remain suitably spaced and the folds will also be capable of withstanding the pressure applied for clamping the band around the conduit.

The means provided for thus tightening the band comprises a bolt S which has an intermediate curved portion T of substantially the same degree of curvature as the band D, and on opposite sides of the curved portion T are straight portions U which extend through the apertures in the folds H and R. The ends of the straight portions U extend beyond the outer legs J of the folds and are threaded to receive nuts V which act against the legs J of the folds to tighten the band D on the conduit B.

The folds H and R extend laterally of the band and are suitably spaced with respect to each other along the length of the band so that the band may be used for clamping conduits of different diameters. As illustrated, and more particularly in Figure 2, the relative positions of the folds H and R are those which they will assume when the clamp is applied to the conduit of minimum diameter for which the clamp may be intended. It will be observed that when so used there are no abutting portions of the clamp which would tend to limit the degree of clamping pressure which may be applied.

When applied to a conduit of larger diameter the folds H and R will of course be more widely spaced with respect to each other, but inasmuch that the clamping means, such as the bolt T, is suitably curved the same clamping pressure acting in substantially the same manner against the folds H and R may be applied irrespective of the size of the conduit within the range of sizes for which a specific clamp is intended.

I claim:

1. A clamp comprising a band adapted to be looped around a conduit and having a pair of integral perforated folds, one of said folds being located intermediate the ends of the band and the other fold having a free end terminating between said folds, and means in the perforations of the folds for tightening the band on a conduit.

2. A clamp comprising a band adapted to be looped around a conduit, a plurality of folds in the band and having apertures therein, one of said folds being located intermediate the ends of the band and the other fold having a free end terminating between said folds, a bolt in the apertures, and means on the bolt to act against the folds for tightening the band on a conduit.

3. A clamp comprising a band adapted to be looped around a conduit, a pair of open loops integral with the band and spaced along the length of the band to provide a tongue at one end thereof, apertures in the loops, a bolt in the apertures, means on the bolt acting against the loops to tighten the band on a conduit, and means in each loop to resist closing thereof when said band is tightened.

4. A clamp comprising a band adapted to be looped around a conduit, a pair of lateral U-shaped folds integral with the band, one of said folds being located at one extremity of the band and the other fold being located intermediate the ends of the band, a tongue forming one end of the band and adapted to fold under the other end of said band, apertures in the folds, a curved bolt in the apertures, and nuts on the bolt acting against the folds to tighten the band on a conduit.

5. A clamp comprising a band adapted to be looped around a conduit and having a pair of integral folds of U-shape having apertures therein, means on the band associated with the apertures to hold the ends of each fold in spaced relation with respect to each other, and means in the apertures to tighten the band on a conduit.

6. A clamp comprising a band adapted to be looped around a conduit, a pair of ears or folds of U-shape integral with the band and extending laterally thereof, apertures in the legs of the folds, clips at the end of one aperture in each fold and adapted to abut the end wall of the aperture in the other leg of the same fold, a bolt in the apertures, and means on the bolt acting against the folds to tighten the band on a conduit.

7. A clamp comprising a split band adapted to be looped around a conduit and having a pair of folds therein, the free end of one fold terminating between said folds and the free end of the other fold projecting beyond the first said fold.

9. A clamp comprising a split band adapted to be looped around a conduit and having a pair of open folds therein, the free end of one fold terminating between said folds, means cooperating with the folds to tighten the band on a conduit, and means in each fold to resist closing thereof when said band is tightened.

9. A clamp comprising a spilt band adapted to be looped around a conduit and having a plurality of open folds therein, means cooperating with the folds to tighten the band on a conduit, and means interposed between the sides of each fold to resist closing thereof when said band is tightened.

In testimony whereof I have signed this specification.

CHARLES C. HANSEN.